June 12, 1923.
R. GRIMSHAW ET AL
HEIGHT INDICATOR FOR LIQUIDS
Filed Oct. 9, 1919
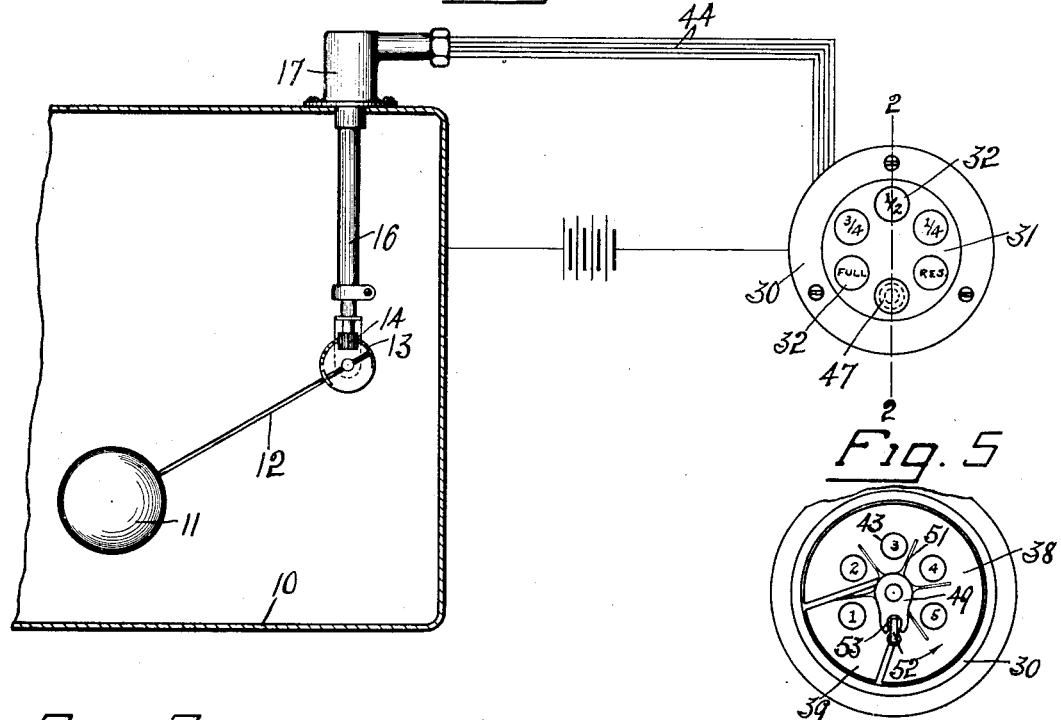
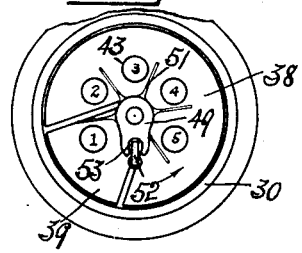
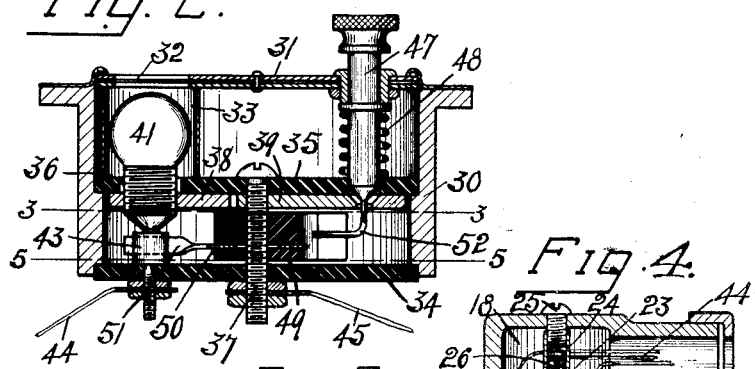
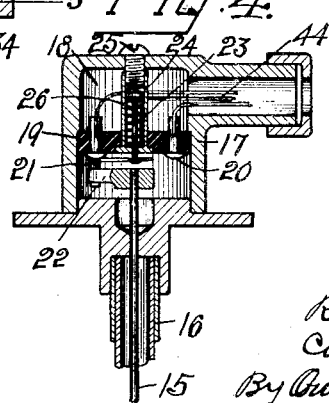
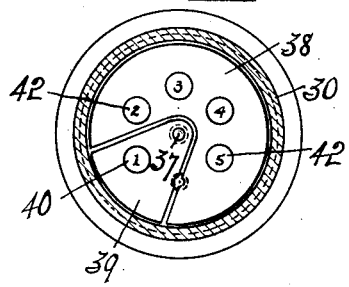

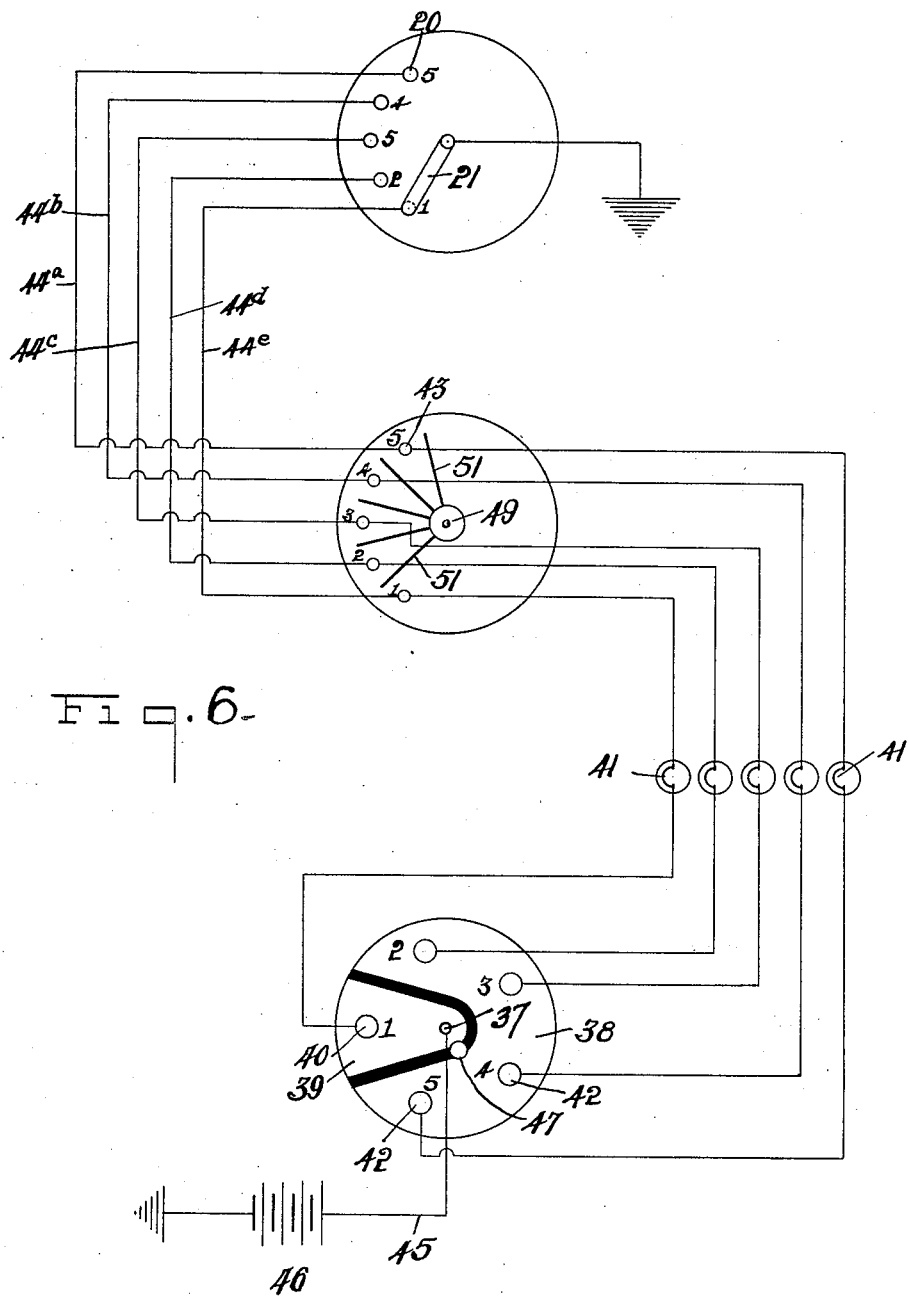

Patented June 12, 1923.

1,458,338

UNITED STATES PATENT OFFICE.

RALPH GRIMSHAW AND CARL JOHN WEIS, OF CLYDE, OHIO.

HEIGHT INDICATOR FOR LIQUIDS.

Application filed October 9, 1919. Serial No. 329,553.

*To all whom it may concern:*

Be it known that we, RALPH GRIMSHAW and CARL JOHN WEIS, citizens of the United States, and residents of Clyde, in the county of Sandusky and State of Ohio, have invented a certain new and useful Height Indicator for Liquids; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to indicators of the type commonly used in connection with tanks to indicate the height of the liquid therein at all times, and has reference particularly to an electrical indicator of this type.

The object of our invention is the provision of an improved simple and efficient means of the class described, which is operable to indicate at any time, by a light or any other electrically operated signal means, the height of the liquid in the tank, whereby to enhance the practicability and commercial value of mechanisms of this class.

A further object of the invention is the provision in connection with a device of the class described, of simple and efficient means for throwing all of the light or signal circuits in closed circuit at one time for the purpose of testing the circuits and determining in an easy manner, which, if any, is inoperative.

The invention is fully described in the following specification, and while, in its broader aspect, it is capable of embodiment in numerous forms, a preferred embodiment thereof is illustrated in the accompanying drawings, in which,—

Figure 1 is a fragmentary sectional view of a tank having a liquid gauge therein electrically connected diagrammatically with an indicator the face of which is shown in elevation. Fig. 2 is an enlarged sectional view of the indicator means on the line 2, 2 in Fig. 1. Fig. 3 is a reduced section on the line 3—3 in Fig. 2, with parts removed. Fig. 4 is an enlarged central vertical section of the upper portion of the float operated switch mechanism. Fig. 5 is a rear end view of the indicator means with the rear terminal carrying member removed and with its contacts shown diagrammatically, and Fig. 6 is a diagrammatical view of the wiring.

Referring to the drawings, 10 designates a tank or container for liquid and 11 a float disposed therein and carried at the outer end of a vertically swinging arm 12 to rise and fall with the liquid in the tank, as well understood in the art. A segmental gear 13 is carried by the arm 12 at its inner end in concentric relation to its swinging axis and meshes with a pinion 14 on a shaft 15 (Fig. 4), which projects up through a tubular casing 16 and into a housing 17 mounted on the top of the tank 10.

The housing 17 forms a chamber 18 in which is disposed a cross insulating member or disk 19 in axially spaced relation to the adjacent end of the shaft 15 and carrying a plurality of contacts 20, which project through the insulating member and have their lower ends exposed below the insulating member and circularly arranged so that they stand in the swinging arc of a conductor piece 21, carried by a transversely projecting arm 22 on the upper end of the shaft 15, whereby a rotation of the shaft places the conductor piece 21 successively in contact with the different contacts 20 of the set. The conductor piece 21 has permanent connection with a post 23, which projects out through a shell 24 carried by the insulating member 19 axially of the shaft 15, and the post 23 has electrical connection with the wall of the housing 17 through a screw 25. The post 23 is preferably yieldingly held in contact with the screw by a coiled compression spring 26 in the shell 24. The post 23, in the present instance, projects from the piece 21 and the latter is flexible to permit yielding movements thereof with the post. The purpose of electrically connecting the conductor piece 21 with the housing 17 is to ground a circuit from any contact 20 with which the conductor piece may be in contact, the grounding through the tank casing, or the casing may act as a part of the return battery circuit as hereinafter described.

The registering instrument or indicator means, which may be mounted in any convenient position, as for instance on the dash of an automobile when used in connection with its gasoline tank, in its present embodiment comprises a cylindrical casing 30 having its front end closed by an opaque member 31 provided in circular series therearound with a plurality of windows 32 each of which registers with a separate light compartment 33 in the casing. The rear end of the casing 30 is closed by an insulating member 34, and in spaced relation to this and at the rear ends of the light compartments 33 is a second insulating disk or member 35 having an opening 36 therethrough in register with each light compartment. The insulating members 34 and 35 are drawn to opposing internal shoulders on the casing 30 by a bolt 37 serving at its outer end as a binding post for a terminal wire.

The insulating member 35 is provided on its rear side with two segmental plates 38 and 39 of brass or other suitable electric conductive material, which are spaced apart so that they are electrically insulated by the member 35, and together cooperate to form a disk except for the insulating space therebetween. The plate section 39, which is the smaller of the two, is electrically connected to the terminal post 37 and has an opening 40 therein (Fig. 3) in which the base of one of the signal lamps 41 is mounted, the outer or light end of the lamp projecting into the registering light compartment 33. The other conductor plate 38 has openings 42 in circular series therein into which the remaining signal lamps may be threaded and which, together with the opening 40, correspond in number to the windows 32 in the face of the registering instrument and to the number of contacts 20 in the float mechanism switch.

The insulating disk 34 carries electrical contact points 43 at its inner side in register with a respective one of the openings 40, 42 in the conductor plates 38 and 39 so that the lamps 41, when screwed into said conductor plates have electrical contact with the contact points. Each point 43 has a terminal post projecting outward therefrom through the insulating disk 34 and connected by one of a series of circuit wires 44$^a$, 44$^b$, 44$^c$, 44$^d$, and 44$^e$ with a corresponding contact 20 in the float mechanism, as indicated by the wiring diagram in Fig. 6. The center post 37 is connected by a wire 45 to a source of electrical supply, as for instance, to one side of a battery 46, the other side of which may either be grounded or connected through the tank casing with the grounding conductor piece 21.

The signal windows 32 employed, in the present instance, are five in number and may be marked to designate reserve, one-quarter full, one-half full, three-quarters full, and full in the successive order given. The "reserve" signal lamp 41 is threaded in the opening 40 of the segmental conductor plate 39 so that when the float 11 is in position to indicate the reserve tank supply of liquid, the conductor piece 21 of the float mechanism will be in engagement with the conductor 20, which is in circuit through the wire 44$^a$ with the reserve lamp so that the lamp will be automatically lighted as soon as such contact is closed. The other lamps of the set, however, are threaded into the segment plate 38 so that they are not in closed circuit with the battery even though the float mechanism contacts therefor, or any one of them, is closed, where the space between the plates 38 and 39 is not electrically bridged.

When it is desired to determine the height of the liquid in the tank the operator presses inward on a plunger or key 47, which is of electrical conductive material, at least at its inner end, and causes it to close a circuit across the gap between the plates 38 and 39. The lamp indicating the height of the liquid is thus brought into closed circuit by reason of its float mechanism contact 20 being grounded through the connection of the contact piece 21 therewith, and it will accordingly be lighted. For instance, if the tank is one-half full, the float operated contact 21 will engage the contact 20 from which the circuit wire 44$^c$ extends and which connects with the contact 43 designated "3." This contact is in turn electrically connected with the source of supply through the corresponding lamp 41, the plate 38, bridge member 47, plate 39, post 37, and wire 45. The plunger or key 47 is projected through the face of the registering mechanism and adapted to be pressed at its inner end into the space between the two conductor plates 38 and 39 and into circuit closing contact therewith. A spring 48 acts on the plunger to normally retain it in open circuit position, as shown in Fig. 2.

For the purpose of simultaneously testing all of the signal circuits to determine if any is inoperative, an insulated hub member 49 is mounted for rotary movements on the bolt 37 at the inner side of the insulating disk 34 and carries a conductor spider or brush 50 having a plurality of electrically connected radiating arms 51 projecting between different pairs of contact points 43, whereby a turning of the brush or spider in one direction will cause the brush to make contact with each of the points 43. To facilitate a turning of the brush 50 into and out of contact with a contact point 43, the inner end of the key or plunger 47 is provided with an L extension 52, which projects into a notch 53 in a side of the brush hub 49 and causes a turning of the hub when the plunger or key 47 is turned. The spacing of the contacts 20 in the float mechanism switch and the width of the contact portion 29 of the switch member 21 should be such that said piece will always be in contact with some one of the contacts 20 so that there will be no dead light or circuit position in a movement of the switch piece 21 from one end of its stroke to the other.

In the use of the invention the float 11 rises and lowers with the liquid in the tank. If the liquid has lowered to the reserve supply point, the float actuated conductor piece 21 stands in position to make contact with the reserve supply contact 20 (as shown in Fig. 6) thereby closing a circuit at one side with the ground or through the piece 23 and shell 24 and at its other side with the battery 46 through the connection 44$^e$, contact 43, reserve lamp 41, segment plate 39, post 37 and connection 45, the latter connection leading to one side of the battery while the other side of the battery is grounded. The closing of such reserve circuit causes a lighting of the lamp 41 which indicates the reserve supply. Should the tank be half full the conductor piece 21 registers with the third contact of the set 20 thereby closing a circuit at one side with the ground through the grounding connection and closing the connection 44$^c$ with the third contact 43 in the indicator which contact is electrically connected through the third lamp to the segmental plate 38. This plate, however, is out of connection with the battery so that the circuit is open. To close the circuit the plunger 47 is pushed inward thereby electrically bridging the gap between the plates 38 and 39, post 37 and connection 45 with the battery, thus effecting a lighting of the lamp 41 indicating a half full condition of the tank.

To test the condition of all of the circuits, the operator presses the plunger 47 inward to close the gap between the plates 38 and 39, and then turns the plunger so as to cause its L-shaped finger 52 to coact with and turn the brush 50 into contact with each of the contacts 43 so that when the conductor piece 21 is in contact with one of the contacts 20, a circuit for each lamp will be completed including battery 46, wire 45, plates 39 and 38 the respective contact 40 or 42, the corresponding lamp, the corresponding contact 43, the spider, the contact 43 in electrical contact with arm 21 and the ground connection from arm 21 to the battery. If any of the signal lamps or signal circuits are defective, this condition will be instantly apparent by the failure of the lamp in such circuit to light.

It is evident that we have provided a simple and efficient liquid height indicating device which will automatically indicate when the float has lowered to the reserve supply position and which may be manually operated at any other time by an inward pressing of the plunger 47 to determine the height of the liquid by closing the circuit in which the switch piece 21 of the float mechanism switch is then in series. It is also evident that the condition of all the circuits may be determined at any time by turning the key or plunger 47 to place the brush arms in contact with the respective points 43 and connecting plates 38 and 39 by depressing the plunger when any one of the signal circuits is closed.

We wish it understood that our invention is not limited to any specific construction, arrangement or form of the parts, as it is capable of numerous modifications and changes without departing from the spirit of the claims.

Having thus described our invention, what we claim as new, and desire to secure by Letters Patent, is,—

1. A plurality of electric signal circuits each having a signal device therein, a plurality of switches operable to close any circuit, and means operable to close all of the circuits when any one is closed.

2. A plurality of electric signal circuits each having a signal device therein, a switch operable to close one of the circuits and to partially close any of the other circuits, a second switch operable to cooperate with said first switch to complete the closing of any of said other circuits, and means operable to close all of the circuits when any one is closed.

3. A plurality of electric signal circuits each having a signal device therein, a switch having a contact for each circuit and a member movable into engagement with any contact to partially close its circuit, means operable to complete a closing of any circuit partially closed by the switch, and manually operable means for closing all of the circuits when any one is closed.

4. A plurality of electric signal circuits each having a signal device therein, a switch having a separate contact in each circuit and a member movable to successively engage the contacts in their order of arrangement to partially close the respective circuits, a float mechanism operable by the rise and fall of a liquid to move the movable member of the switch to make contact with different circuit contacts, means operable to complete a closing of any circuit partially closed by the switch, and means normally in inoperative position and manually operable to close all of the circuits when any circuit is closed.

5. A plurality of electric signal circuits each having a signal device therein, a float operated switch operable to successively partially close the different circuits and to open the others, a signal device for each circuit normally being in open circuit therein, and means operable to close a circuit when the float operated switch is in closed relation to such circuit and also operable to close all of the signal circuits when any circuit is closed.

6. A sectional conductor plate having its sections insulatingly spaced, a plurality of signal circuits having signal devices connected to said conductor sections, some of said circuits including both conductor sections, a switch operable to selectively close breaks in each of said circuits, and means operable to electrically connect the conductor sections.

7. In a device of the class described, a casing, a conductor plate mounted therein and having insulatingly spaced sections, electrical signal devices connected to each of said sections, an insulating member carried by the casing in spaced relation to said plate, conductor points carried thereby in contact with respective signal devices, a battery, connection between one side of the battery and one of the sections of said plate, connection with the other side of the battery from each of said conductor points, means operable to separately close breaks in said last connections, and means operable to electrically connect the sections of said plate.

8. In a device of the class described, a casing, a conductor plate mounted therein and having insulatingly spaced sections, electrical signal devices some connected to one and some to another of said sections, an insulating member carried by the casing in spaced relation to said plate, conductor points carried thereby in contact with respective signal devices, a battery, connection between one side of said battery and one of the sections of said plate, connection with the other side of the battery from each of said conductor points, means operable to separately close breaks in said last connections, means operable to close any circuit when a break therein is closed by said first means, and a brush member operable to electrically connect all of the conductor points to close all of the signal circuits when any one is closed.

9. In a device of the class described, a casing, a conductor plate mounted therein and having insulatingly spaced sections, electrical signal devices some connected to one and some to another of said sections, an insulating member carried by the casing in spaced relation to said plate, conductor points carried thereby in contact with respective signal devices, a battery, connection between one side of said battery and one of the sections of said plate, connection with the other side of the battery from each of said conductor points, means operable to separately close breaks in said last connections, a brush member operable to electrically connect all of the conductor points to close all of the signal circuits when any one is closed, and means operable to electrically connect the sections of said plate and to move the brush the member into and out of contact with the contact points.

In testimony whereof, we have hereunto signed our names to this specification.

RALPH GRIMSHAW.
CARL JOHN WEIS.